Patented Sept. 1, 1931

1,821,321

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

CELLULOSE FIBER FOR PREPARATION OF ESTERS AND PROCESS OF PRODUCING SAME

No Drawing.   Application filed August 28, 1926.   Serial No. 132,319.

This invention relates to the production of cellulose fiber especially suitable for use as a raw material for the preparation of cellulose esters and cellulose products of high purity and commercial value, and also to a process of producing the same.

The suitability of cellulose fiber for the preparation of cellulose derivatives and cellulose products is enhanced by raising its alpha cellulose content and lowering its soda solubility, solution viscosity, and copper number by suitable treatment. Hence the object of this invention is to provide a process of favorably modifying the characteristics of cellulose fiber for the preparation of cellulose derivatives and cellulose products.

I have discovered that this object may be attained by first depolymerizing the fiber and then treating it to remove non-alpha cellulose constituent. Depolymerization of cellulose fiber is practised, for example, in conditioning fiber for the preparation of rayon by the viscose process. In the rayon industry, the fiber is usually purchased in the form of sheets. These sheets are thoroughly soaked in a solution of caustic soda of mercerizing strength, pressed free of excess solution, and then allowed to age or season under the proper conditions for about two or three days. During the ageing period, a depolymerization and reduction of solution viscosity of the cellulose fiber takes place, so that when the caustic soda-treated fiber or soda cellulose is treated with carbon bisulphide, the xanthate solution produced is of sufficiently low viscosity to permit successful spinning. Thus a fiber having an initial solution viscosity of 6 to 7, as measured by a cuprammonium solution thereof, may show a solution viscosity of 1 to 2 after soaking with caustic soda solution, and a solution viscosity of 0.1 to 0.2 after ageing for the usual period.

During the ageing period, certain other changes take place. The alpha cellulose constituent of the fiber is gradually decreased and the soda soluble constituent is correspondingly increased. Thus, the alpha cellulose content of a fiber after soaking in caustic soda solution may amount to 94% to 95%, whereas the alpha cellulose content of this fiber after the ageing period may drop to from 85% to 94%, depending upon the severity of the ageing.

Depolymerization, therefore, while practised to produce fiber of suitable solution viscosity, as for spinning into rayon filaments, is accompanied by the degradation of the fiber into oxycellulose and other unstable celluloses which deleteriously affect a derivative or product prepared therefrom. For instance, in the viscose process, the aged soda cellulose is treated with carbon bisulphide. This treatment results not only in the xanthation of the alpha cellulose, but also of the oxycellulose and other unstable celluloses. When the xanthate syrup is forced through the spinneret into the acid setting bath, a considerable portion of the unstable celluloses are regenerated along with the alpha cellulose in the rayon filament, adversely affecting its color, strength, and other characteristics.

I have found that if the depolymerized fiber is washed, undesirable water-soluble constituents are removed therefrom. I have also found that if the washed, depolymerized fiber is digested in an alkaline solution for a suitable period, undesirable water-insoluble constituents, such as oxycelluloses, are removed therefrom. The washing and alkaline digesting of a depolymerized fiber not only effects a removal of undesirable constituents formed during the ageing period, but also the removal of undesirable constituents made easily accessible to the solvent action of water and alkaline solution after depolymerization of the cellulose molecule, and thus makes possible the production of fiber of exceedingly high alpha cellulose content and of low soda soluble content, and possessing other notably desirable characteristics.

Furthermore, after washing and alkaline-digesting the depolymerized fiber, it becomes substantially stable, whereas unwashed and undigested depolymerized fiber is unstable, undergoing constant change in characteristics.

A procedure which may be practised may be substantially as follows. Cellulose fiber, e. g., sulphite, is soaked in sheet form in a caustic soda solution of mercerizing strength, and then squeezed to remove excess solution therefrom. The caustic soda-treated sheets are then aged under the proper conditions while exposed to atmospheric air, for about two or three days, to effect the desired depolymerization of the fiber. The aged soda cellulose is then washed to remove undesirable water-soluble constituent, such washing preferably being carried out in a manner to produce a concentrated wash liquor from which the valuable sodium constituent may be economically recovered. The washed, depolymerized fiber is then digested in a caustic soda, lime, or other alkaline solution, preferably a very weak solution, for a few hours. The fiber is then washed free from solution.

I present a comparative table, which indicates the change in characteristics effected upon the usual commercial sulphite fiber by ageing, washing, and by digestion of the washed, aged fiber as a 6% fiber suspension at 210° F., for four hours in a solution containing 4% lime, based on dry fiber weight:

|  | Usual sulphite fiber | Washed aged fiber | Washed and alkaline-digested aged fiber |
|---|---|---|---|
| Alpha cellulose content | 85–87% | 95.7% | 95.3% |
| Solution viscosity | 6–7 | 0.24 | 0.24 |
| Copper number | 2.8–4 | 1.86 | 1.64 |
| Soda solubility (3% NaOH soluble) | 12–25% | 3.03% | 0.84% |
| Color of extract (hot) | 40–60 | 10 | 5 |
| Color of extract (cold) | 40–60 | 10 | 2 |

From the foregoing table, which represents the average of a number of tests, it will be seen that the washed and alkaline-digested aged soda cellulose shows a higher alpha cellulose content and a lower copper number, soda solubility and solution viscosity than the original sulphite fiber. It will further be observed that the washed, aged fiber is substantially unaffected in alpha cellulose content by alkaline digestion, but that its copper number is reduced, its soda solubility is materially reduced, and the color of the alkaline extract is distinctly lighter.

If a high alpha cellulose fiber, i. e., a fiber containing, say, 93% to 95% alpha cellulose, is treated in a manner similar to the treatment of sulphite fiber as hereinbefore described, there may not be an increase (in fact, under certain conditions there may be a slight decrease) in the alpha cellulose content of the washed and alkaline-digested aged fiber. Washing and alkaline-digesting the depolymerized fiber, however, effects the removal of the unstable celluloses formed during the ageing period and hence maintains the high alpha cellulose content of the fiber so that the other desirable changes effected by depolymerization may be taken advantage of without sacrificing the quality of products preparable therefrom.

A somewhat modified procedure may be adopted for removing the unstable celluloses from the depolymerized fiber. Thus, the fiber may be soaked in a solution of caustic soda in the usual manner and then aged to effect a depolymerization of the fiber. The depolymerized fiber may then be washed only to such an extent as to leave behind sufficient caustic soda to carry out successfully the desired subsequent alkaline digestion when water is added thereto. Digestion may be carried out at an elevated temperature, say, 210° F., as previously, and the digested fiber washed free of caustic soda. Such a procedure is particularly applicable in certain cases wherein it is difficult to wash from the depolymerized fiber the last percentage of caustic soda, especially the last two or three per cent.

The process of the present invention makes practical the acceleration of fiber depolymerization, and the shortening of the ageing period from the usual two to three-day period to one to two hours. This may be accomplished as by carrying out the ageing of the fiber at a suitably higher temperature, or by treating the fiber with a sufficient percentage of oxidizing agent, such as bleach. When depolymerization is accelerated, oxycellulose and other unstable celluloses are formed in higher percentage than usual. Such fiber, if used without further treatment, would be less suitable for the preparation of cellulose derivatives or cellulose products than would a fiber that had been aged in a normal manner. In accordance with the process of the present invention, however, inasmuch as undesirable constituents produced by ageing is removed from the depolymerized fiber, greater leeway in ageing conditions is afforded without necessitating a sacrifice of the quality of products preparable from such fiber. In other words, ageing need not be carried out under conditions unfavorable to the formation of unstable celluloses, but may be accelerated to the desired extent.

It is evident that the conditions maintained in the process may be varied to yield fiber of different characteristics. Experiments indicate that from a given fiber as a raw material, a fiber having a solution viscosity of 0.5 or a fiber possessing substantially the same characteristics in other respects but having a solution viscosity of 0.1 to 0.2 may be produced by treating the fiber under different conditions. The present invention, therefore, makes possible the production of different fibers of the same quality, with the exception of solution viscosity, which may be different according to need.

The new fiber thus prepared has characteristics which render it especially suitable for the preparation of cellulose derivatives and cellulose products of high quality. For example, it may be xanthated readily into light-colored viscose syrup, from which an easily bleachable rayon filament may be spun. Since the cellulose has been depolymerized, it is in condition for xanthation and may be treated directly with the usual amounts of caustic soda and carbon bisulphide to form a xanthate solution. It may be nitrated into a product yielding clear solutions of high color and low viscosity, and which are particularly suitable for the manufacture of films and high grade lacquers. It may also be converted into acetate or cuprammonium products of high purity. The purity and good color of solutions of derivatives prepared from the fiber may be ascribed to the fact that lignin, resin, oxycellulose and other non-alpha cellulose constituent present in the usual aged fiber, and which act as colorants, are largely removed by the treatment of the present invention prior to the formation of the derivatives.

It is evident that the process of the present invention may be applied in removing non-alpha cellulose constituent from the different types of depolymerized cellulose fiber, viz., cotton fiber, a refined or high alpha cellulose wood fiber, wood fiber, and grass fiber. The alkaline digestion of the washed, depolymerized fiber may be effected in solutions of various other alkaline compounds than those hereinbefore mentioned, such as sodium sulphide, sodium triphosphate, and sodium borate. Digestion may be carried out either at elevated or low temperature, depending upon the conditions maintained in ageing and washing, the character of the fiber used as a raw material, and the product which it is desired to produce.

The process herein described may be performed on cellulose fiber in any suitable form,—for instance, not only in the form of sheets, as hereinbefore described, but in the form of waterleaf paper. Such paper may be processed to completion while in continuous sheet form.

The expression "soda solubility" as herein applied to cellulose fiber represents constituents of the fiber, by weight, soluble in a hot caustic soda solution of 3% strength.

The term "solution viscosity" is herein applied to cellulose pulp in characterizing the viscosity of solution which its cellulose derivatives yield. The solution viscosity values of pulp herein given denote the viscosity of cuprammonium solutions of prescribed pulp concentration prepared therefrom. The viscosity is determined by measuring the time of efflux of a definite volume under standard conditions through an orifice of standard size. The solution viscosity of pulp is herein given in absolute C. G. S. units, being determined by measuring the viscosity of a solution of 6 grams of pulp in a cuprammonium solution composed of 225 cc. of 28% ammonia water containing 9 grams of cuprous oxide. This cuprammonium solution used in determining viscosity values is of arbitrary composition but has been adopted and is being used in most cellulose laboratories. The C. G. S. viscosity unit is employed because it is definite and denotes a viscosity one hundred times that of water at 20° C., wherefore a cuprammonium cellulose solution of prescribed composition, by which a pulp is identified as having a solution viscosity of 10 is approximately a thousand times as viscous as water at 20° C. glycerine, which is commonly referred to when discussing viscosities, has a viscosity value of between 8 and 9.

Having thus described the nature of this invention, it is obvious that various changes might be resorted to without departing from the spirit or scope of invention as defined by the appended claims.

I claim:

1. A process which comprises washing alkaline depolymerized previously mercerized and aged cellulose fiber and then dissolving non-alpha cellulose components from the washed fiber in an alkaline solution.

2. A process of modifying the characteristics of cellulose fiber, which comprises mercerizing and depolymerizing the fiber, washing the fiber, digesting the fiber in an alkaline solution, and washing the digested fiber.

3. A process of modifying the characteristics of cellulose fiber, which comprises treating the fiber with a caustic soda solution of mercerizing strength, ageing the treated fiber to effect a depolymerization thereof, washing the fiber, and dissolving non-alpha cellulose components from the washed fiber in an alkaline solution.

4. A process of modifying the characteristics of cellulose fiber, which comprises treating the fiber with a caustic soda solution of mercerizing strength, ageing the treated fiber to effect a depolymerization thereof, washing the fiber, digesting the fiber in an alkaline solution, and washing the digested fiber.

5. A process which comprises treating cellulose fiber with a caustic soda solution of mercerizing strength, ageing the treated fiber in the presence of an accelerator of depolymerization to effect a depolymerization thereof, washing the fiber, and digesting the fiber in an alkaline solution.

6. A process which comprises treating cellulose fiber with a caustic soda solution of mercerizing strength, ageing the treated fiber in the presence of an oxidizing agent to effect a depolymerization thereof, washing the fiber, digesting the fiber in an alkaline solution, and washing the digested fiber.

7. Depolymerized cellulose fiber having the following characteristics:

(a) Alpha cellulose content 95%+

(b) Soda solubility (3% caustic soda solution) 1%—

(c) Copper number 2—

8. A process which comprises ageing caustic soda-treated cellulose fiber under accelerated depolymerizing conditions, washing the fiber, and dissolving non-alpha cellulose components from the washed fiber in an alkaline solution.

9. A process of modifying the characteristics of cellulose fiber, which comprises treating the fiber with a solution of caustic soda of mercerizing strength, ageing the treated fiber to effect a depolymerization thereof, washing the fiber only partly free of caustic soda, and digesting the fiber in a solution formed with the caustic soda remaining in such fiber.

10. A process which comprises washing alkaline-depolymerized, mercerized cellulose fiber, then digesting the washed fiber in an alkaline solution, washing the digested fiber, and then converting the fiber into cellulose derivatives.

11. A process which comprises washing alkaline-depolymerized, mercerized cellulose fiber, then digesting the washed fiber in an alkaline solution, washing the digested fiber, and then xanthating the fiber.

12. A process of modifying the characteristics of cellulose fiber, which comprises treating the fiber with a caustic soda solution of mercerizing strength, ageing the treated fiber to effect a depolymerization thereof, washing the fiber, digesting the washed fiber in a hot, dilute solution of alkali, and washing the digested fiber.

In testimony whereof I have affixed my signature.

GEORGE A. RICHTER.